Jan. 15, 1963   J. H. McPHAIL ET AL   3,074,008
CONVERTER
Filed April 5, 1960   2 Sheets-Sheet 1
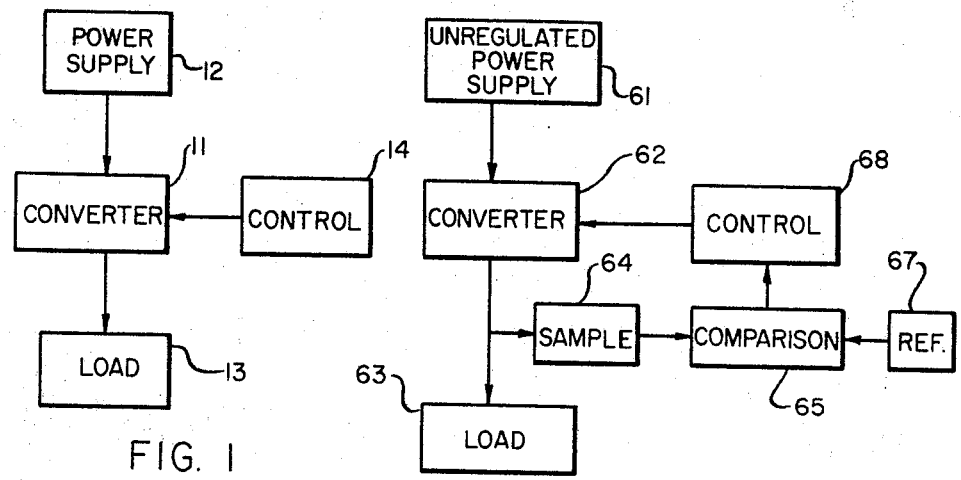
FIG. 1
FIG. 6
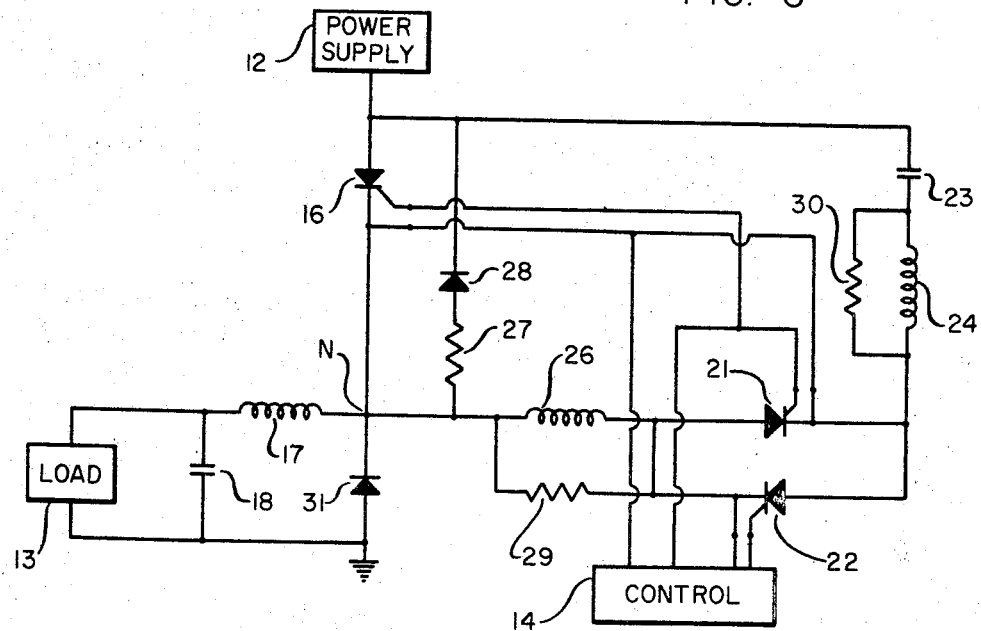
FIG. 2
JAMES H. McPHAIL
WILLIAM E. BUDD
INVENTORS
BY Flehr and Swain
ATTORNEY Jan. 15, 1963    J. H. McPHAIL ET AL    3,074,008
CONVERTER
Filed April 5, 1960    2 Sheets-Sheet 2

JAMES H. McPHAIL
WILLIAM E. BUDD
INVENTORS

BY *Flehr and Swain*
ATTORNEY

_United States Patent Office_

3,074,008
Patented Jan. 15, 1963

3,074,008
CONVERTER
James H. McPhail, Santa Clara, and William E. Budd, Los Altos Hills, Calif., assignors to Melabs, Palo Alto, Calif., a corporation of California
Filed Apr. 5, 1960, Ser. No. 20,141
9 Claims. (Cl. 323—22)

This invention relates generally to a direct current power converter.

It is a general object of the present invention to provide a variable high voltage, high current power converter for converting power supplied from a direct current power source.

It is another object of the present invention to provide a high voltage, high current converter employing solid state devices.

It is a further object of the present invention to provide a converter for use in high power application such as welding, solenoid controls, and the like.

It is still a further object of the present invention to provide a circuit suitable for providing variable duty cycle high voltage, high current pulses.

It is another object of the present invention to provide a converter suitable for use as the regulating element of a high voltage, high current regulated power supply.

It is still another object of the present invention to provide a converter which is simple in construction and efficient in operation.

In general, the foregoing objects are achieved by employing a controlled rectifier serving to selectively connect a direct current power source to an associated load circuit. An oscillatory circuit is connected in circuit with the controlled rectifier and serves to store charge and is selectively discharged to interrupt the current flowing through the rectifier to turn it off.

The foregoing and other objects will become more clearly understood from the following description taken in conjunction wiht the accompanying drawing.

Referring to the drawing:

FIGURE 1 is a schematic block diagram illustrating a power control system incorporating the present invention;

FIGURE 2 is a detailed circuit diagram of a converter in accordance with the invention;

FIGURE 6 shows a regulated power supply including a converter in accordance with the present invention.

Figure 3:
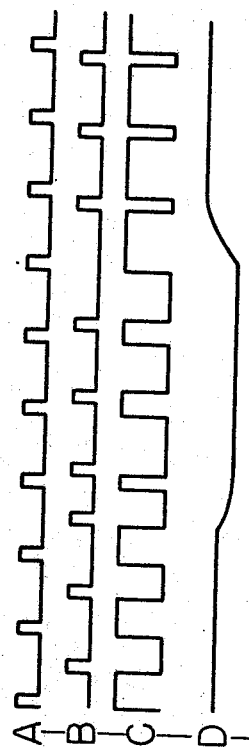
FIGURE 3 shows the voltage waveforms at various points in the circuit of FIGURE 2.

Referring to FIGURE 1, a converter 11 is connected to the direct current power source 12 to control the application of power from the supply to the associated load 13. A control circuit 14 is employed to control operation of the converter. The converter 11 acts as a switching means responsive to control signals from the control circuit 14 to selectively connect the power source 12 to the load. The switching can be made to take place at a predetermined frequency. The period of time during each cycle that the power source is connected to the load 13 is varied to control the power (variable duty cycle).

As will become presently apparent, the control circuit 14 may be any circuit which serves to deliver first or turn-on pulses and second or turn-off pulses with the second pulses having a variable timing with respect to the first pulses. The power source is connected to the load during the interpulses period. In essence, a rectangular wave of voltage is applied to the load.

Referring to FIGURE 2, a converter in accordance with the invention is shown. The power source is connected to the load 13 through a controlled rectifier 16 which serves to selectively connect the power source to the filter circuit including the inductor 17 and capacitor 18, and associated load.

The controlled rectifier is preferably a solid state rectifier including a gating terminal. The rectifier will block the flow of current in a reverse direction until the applied voltage reaches a breakdown value. Similarly, the rectifier will block the flow of current in the forward direction until a forward breakdown voltage is reached. However, the device can be gated into a high conductance state when the forward voltage is less than breakdown by application of a gating signal. The rectifier will continue to operate in its high conductance state even when the gating signal is removed until the current flow is interrupted or diverted. The rectifier is then turned off and regains its forward blocking capabilities.

The controlled rectifier 16 is supplied control (gating pulses) of the type illustrated in FIGURE 3A to selectively turn it on. As will be presently described, the rectifier is turned off by an associated oscillatory circuit which interrupts the current flow. A typical rectangular wave voltage applied to the filter from the power source is shown in FIGURE 3C. The input from the filter to the load is shown in FIGURE 3D.

The circuit including the oppositely poled controlled rectifiers 21 and 22, storage capacitor 23, inductors 24 and 26, resistor 27, and the diode 28 form the oscillatory circuit which interrupts current flow in the controlled rectifier 16 to turn the same off in response to turn off pulses applied to the controlled rectifier 22. Damping resistors 29 and 30 are employed to reduce spurious oscillations.

Operation of the oscillatory circuit to interrupt current flow is substantially as follows. When a turn-on pulse, of the type shown at 3A, is applied to the controlled rectifier 16, it is also applied to the controlled rectifier 21. Gating of the controlled rectifier 16 effectively connects the power source 12 to the common node N. There will be small voltage difference corresponding to the forward drop in the controlled rectifier 16. Since the controlled rectifier 21 is also gated on, the voltage at the node N is impressed on the oscillatory circuit.

The inductors 24, 26 and capacitor 23 form a series resonant circuit which oscillates at a predetermined frequency. The frequency is so selected that the capacitor 23 is charged and discharged rapidly. It is observed that the oscillation can take place only while the oscillatory current is flowing in the forward direction for the device 21. When the current tries to reverse, the voltage across the devices 21 and 22 is not sufficient to cause breakdown in the reverse direction. Thus, the capacitor remains charged at the maximum voltage obtained during the initial half cycle of oscillation. The oscillatory circuit is selected such that the maximum voltage achieved during the first half cycle of oscillations is as high as possible, approximately two times the power supply voltage.

The charge on the storage capacitor 23 is stored until a turn-off pulse is applied to the controlled rectifier 22 as, for example, from the control circuit 14. When the rectifier 22 is turned on, current tends to flow in the reverse direction through the rectifier 16. This interrupts the current flow and the device is then turned off.

Turning on of the rectifier 22 causes a half cycle of oscillation and current will flow through the rectifier 16 until it turns off. When the impedance of the rectifier 16 is greater than the series impedance of resistor 27 and diode 28, current will flow through this alternate path.

The capacitor 23 is then fully discharged and in readiness for the next cycle of operation.

It is observed, however, that the magnetic fields in the filter choke 17 have as yet not collapsed. Collapsing of these fields causes the load current to continue flowing in the forward direction even after rectifier 16 is turned off. The current is then supplied through the rectifier 22. The diode 28 will have less current flow through it than the rectifier 22 and will turn-off sooner. When the current in the resonant circuit starts to reverse, the controlled rectifier 22 turns off and the diode 31 then turns on. The diode provides a current path to give further collapse of the field in the filter choke 17. The foregoing sequence continues at the rate determined by the pulses shown in FIGURE 3A. The duty cycle (power delivered) is varied by adjusting the timing (phase) between the turn-on and turn-off pulses.

Figure 4:
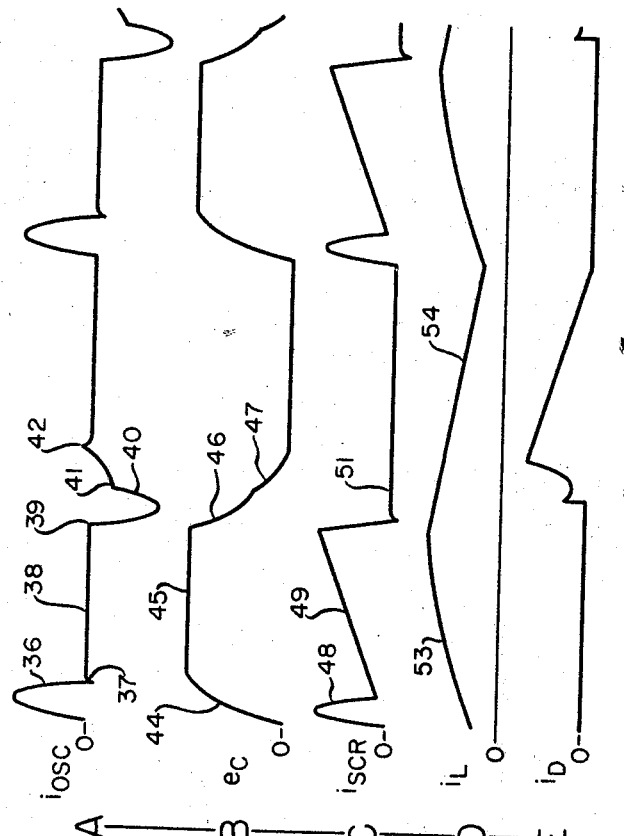
FIGURE 4 shows the current and voltage waveforms at various points in the circuit of FIGURE 2.

Referring to FIGURE 4, the foregoing operation is illustrated by waveforms. In FIGURE 4A, the current flowing through the inductors is shown as being positive for a half cycle 36, at which time it starts to reverse 37, as previously described, and the controlled rectifier 21 turns-off as shown at 38. At the time 39, the turn-off pulse is applied and the circuit tends to oscillate as indicated by the wave 40. The diode 28 turns-off at 41 and the controlled rectifier 22 turns-off at 42 after a slight reversal of current. The cycle of operation is then repeated. FIGURE 4B shows the voltage on the capacitor 23. The voltage rises as indicated at 44 during the current pulse 36. It remains charged 45 until the rectifier 22 is triggered. It discharges through diode 28 and load as shown at 46 and then to the load as shown at 47. FIGURE 4C shows the current through the controlled rectifier 16. Initially, the current is the total of that required to charge the storage capacitor, as shown at 48, and load current. Then the current continues to increase as dictated by the load as shown at 49. Application of the turn-off pulse turns off the controlled rectifier 16 and the current is reduced to zero as indicated at 51. The load current is dependent upon the voltage applied and is of the form shown in FIGURE 4D. It has a D.-C. level about which it increases until the voltage is removed and then decreases as shown at 53 and 54. The current through the diode 31 is illustrated in FIGURE 4E. It is seen that there is a current which starts to flow after the controlled rectifiers 16 and 22 are turned off.

Figure 5:
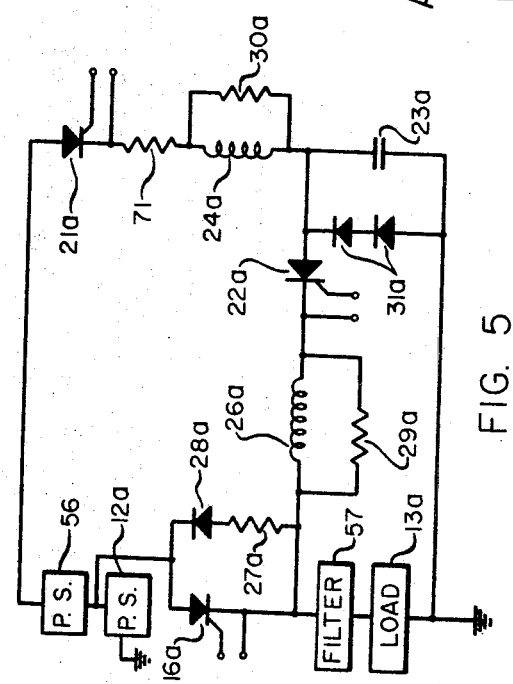
FIGURE 5 shows another circuit incorporating the present invention.

The repetition rate of the circuits as shown may be limited by the necessity of having to completely discharge capacitor 23 through the load after diode 28 is turned off. The circuit of FIGURE 5 corrects this. In the circuit of FIGURE 5, like reference numerals are applied to parts which correspond to FIGURE 2. It is observed that the circuit configuration is slightly different. However, the operation is essentially as set forth above, as will be apparent from the following.

A second voltage supply 56 is connected in series with the main supply 12a and provides an additional increment of voltage to the storage capacitor. The controlled rectifier 21a is connected between the additional supply and the inductor 24a. The inductor 24a and capacitor 23a form the oscillatory circuit. When the rectifier 16a is gated on, the controlled rectifier 21a is also gated on thereby applying a voltage greater than the supply voltage to the oscillatory circuit. During the first half cycle of oscillation, the voltage on the capacitor 23a will rise to a value greater than two times the applied voltage. As before, the current cannot reverse, and thus the storage capacitor remains charged until a turn-off pulse is applied to the controlled rectifier 22a. The capacitor is then discharged to interrupt the current flow through the controlled rectifier 16 and turn the same off in the manner previously described. The circuit including resistor 27a and diode 28a diverts the current from the controlled rectifier 16a. The diode 31a provides a path for collapsing the fields in the chokes forming the filter 57.

A converter of the foregoing type may be employed in conjunction with a reference source, and sampling and comparison circuits to construct a regulated variable high power supply with an unregulated power source. A block diagram of a circuit suitable for this purpose is shown in FIGURE 6. The unregulated power source 61 serves to supply power to the converter 62 which is adapted to selectively connect the unregulated supply to the load 63. Either the output voltage or current is sampled by the circuit 64 and the sampled signal is applied to comparison circuit 65. A local current or voltage reference 67 is also applied to the comparison circuit. The comparison circuit develops an error signal when the reference and sample do not have a predetermined relationship. The error signal is applied to the control circuit 68 which will serve to alter the time delay between the turn-on and turn-off pulses to thereby vary the duty cycle of the output voltages applied to the load.

In one particular example, a circuit was constructed as shown in FIGURE 5 with the components and voltages being as follows:

The filter circuit was of the type shown in FIGURE 2 with inductance 17 equal to 100 millihenrys and capacitance 18 equal to 1000 microfarads. The load was inductive with resistance equal to 14 ohms, and inductance equal to 100 millihenrys. Power supply 12a was equal to 250 volts (15 amps.), and power supply 56 was equal to 80 volts. Controlled rectifiers 16a, 21a and 22a are known by manufacturer's specification as General Electric C35D. Diodes 28a and 31a are known by manufacturer's specification as 40j2. Resistors 29a and 30a are each equal to 330 ohms; resistors 27a and 71 are each equal to ½ ohm. Capacitors 23a equal 0.6 microfarad; inductor 26a equal to 200 microhenrys; and inductor 24a equal to 250 microhenrys.

The gating pulses for the controlled rectifiers were at 800 cycle. By varying the phase relationship of the turn-on and turn-off pulses, the current to the load was varied between 1 and 12 amperes. The phase was then gradually increased over a period of two seconds and the current varied substantially linearly from 1 to 12 amps.

We claim:

1. A converter serving to supply variable power to a load from a direct current power source supplying a voltage including a first controlled rectifier for selectively connecting the power source to the load in response to a gating signal, said controlled rectifier having forward and reverse breakdown voltages below which it has a low conductance and gating means responsive to a gating signal for gating the rectifier into a high forward conductance in which state it continues to operate until the current flowing through the same is interrupted, said controlled rectifier having a forward breakdown voltage greater than the power source voltage, an oscillatory circuit including a storage capacitor, means responsive to the gating signal for applying the source voltage to the oscillatory circuit, means for holding the charge in said storage capacitor, and means for selectively discharging the oscillatory circuit to turn off the controlled rectifier.

2. A converter serving to supply variable power to a load from a direct current power source supplying a voltage including a first controlled rectifier serving to selectively connect the power source to the load in response to a gating signal, said controlled rectifier having forward and reverse breakdown voltages below which it has a low conductance and gating means responsive to a gating signal for gating the rectifier into a high forward conductance in which state it continues to operate until the current flowing through the same is interrupted, said controlled rectifier having a forward breakdown voltage greater than the power source voltage, an oscillatory circuit including a storage capacitor, a second controlled rectifier including gating means serving to selectively connect the oscillatory circuit to the power supply, means for applying a gating signal to the gating means of said first and second controlled rectifiers to gate the same into the high conductance state whereby the source voltage is applied to the load and to the oscillatory circuit causing the same to oscillate, said oscillatory circuit serving to continue to oscillate as current flows in one direction, said second controlled rectifier serving to be turned off as the current in the oscillatory circuit starts to reverse whereby a charge is stored in the storage capacitor, a third controlled rectifier including gating means adapted to selectively connect the storage capacitor to the first controlled rectifier, and means for applying a gating signal to said third controlled rectifier to cause a flow of current from the storage capacitor through the first controlled rectifier to interrupt the current flowing through the same to turn it off.

3. A converter as in claim 2 including additionally a current path serving to bypass current flowing from the storage capacitor to the first controlled rectifier when the first controlled rectifier is turned off.

4. A converter as in claim 2 including additionally filter means adapted to be selectively connected to the power source, and means for bypassing said filter means when the third controlled rectifier is turned off.

5. A regulated power supply including a source of unregulated voltage, a converter serving to supply variable power to a load from said unregulated power source, said converter serving to supply variable power to a load from a direct current power source having a predetermined voltage including a first controlled rectifier serving to selectively connect the power source to the load, said controlled rectifier having forward and reverse breakdown voltages below which it has a low conductance and gating means responsive to a control signal for gating the rectifier into a high forward conductance in which state it continues to operate until the current flowing through the same is interrupted, said controlled rectifier having a forward breakdown voltage greater than the power source voltage, an oscillatory circuit including a storage capacitor, sampling means serving to sample the power applied to the load, reference means, comparison means serving to compare the sampled power and the reference power and derive an error signal, control means responsive to said signal and serving to provide control signals in the form of turn-on and turn-off pulses having a time separation which is dependent upon the error signal.

6. A converter serving to supply variable power to a load from a direct current power source supplying voltage thereto including a first controlled rectifier having first and second terminals, said controlled rectifier having forward and reverse breakdown voltages below which it has a low conductance and a gating means responsive to a gating signal for gating the rectifier into a high forward conductance in which state it continues to operate until the current flowing through the same is interrupted, said controlled rectifier having a forward breakdown voltage greater than the power source voltage, a filter circuit connected to supply filtered power to the load, said controlled rectifier having its first terminal connected to a power source and its second terminal connected to the first filter, an oscillatory circuit including a storage capacitor, second and third controlled rectifiers adapted to connect the second terminal of the oscillatory circuit to the second terminal of the first controlled rectifier in response to gating pulses, said first and second controlled rectifiers being connected to conduct currents of opposite polarity to said second terminal in response to gating signals.

7. A converter as in claim 6 including additionally current paths serving to bypass the current flowing from the storage capacitor of the oscillatory means to the first controlled rectifier when the first controlled rectifier is turned off and current is being supplied thereto of a polarity opposite to the normal conducting polarity of said first rectifier.

8. A converter serving to supply variable power to a load from a direct current power source supplying voltage thereto including a first controlled rectifier having first and second terminals, said controlled rectifier having forward and reverse breakdown voltages below which it has low conductance and a gating means responsive to a gating signal for gating the rectifier into high forward conductance in which state it continues to operate until the current flowing through the same is interrupted, said controlled rectifier having a forward breakdown voltage greater than the power source voltage, a filter circuit connected to supply filtered power to the load, said controlled rectifier having its first terminal connected to the power source and its second terminal connected to the filter circuit, an oscillatory circuit including a storage capacitor, a second power source, a second controlled rectifier adapted to selectively connect the direct current power source and the additional power source to the oscillatory circuit to thereby charge the storage capacitor, a third controlled rectifier adapted to selectively connect said storage capacitor to the second terminal of the first controlled rectifier to thereby interrupt the current flowing through the same, and bypass means connected in shunt to said controlled rectifier serving to bypass current of polarity opposite to the normal conducting polarity.

9. A converter serving to supply variable power to a load from a direct current power source supplying a voltage including a first controlled rectifier for selectively connecting the power source to the load in response to a gating signal, said controlled rectifier having forward and reverse breakdown voltages below which it has a low conductance and gating means responsive to a gating signal for gating the rectifier into a high forward conductance in which state it continues to operate until the current flowing through the same is interrupted, said controlled rectifier having a forward breakdown voltage greater than the power source voltage, storage means, means responsive to the gating signal for applying power from the source to the storage means, means for storing power in said storage means, and means for selectively connecting the storage means to the controlled rectifier.

References Cited in the file of this patent
UNITED STATES PATENTS
2,925,546   Berman _____ Feb. 16, 1960

Notice of Adverse Decision in Interference

In Interference No. 94,362 involving Patent No. 3,074,008, J. H. McPhail and W. E. Budd, CONVERTER, final judgment adverse to the patentees was rendered Mar. 31, 1966, as to claims 5 and 9.

[*Official Gazette June 28, 1966.*]